US012694119B2

(12) United States Patent
Wang et al.

(10) Patent No.: US 12,694,119 B2
(45) Date of Patent: Jul. 28, 2026

(54) SYSTEM STARTING METHOD, SYSTEM STARTING DEVICE, SERVER, AND READABLE STORAGE MEDIUM

(71) Applicant: SUZHOU METABRAIN INTELLIGENT TECHNOLOGY CO., LTD., Suzhou (CN)

(72) Inventors: Changhong Wang, Suzhou (CN); Tuo Li, Suzhou (CN); Kai Liu, Suzhou (CN); Hongtao Man, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 341 days.

(21) Appl. No.: 18/565,227

(22) PCT Filed: Mar. 29, 2022

(86) PCT No.: PCT/CN2022/083593
§ 371 (c)(1),
(2) Date: Jul. 10, 2024

(87) PCT Pub. No.: WO2023/071040
PCT Pub. Date: May 4, 2023

(65) Prior Publication Data
US 2025/0028836 A1 Jan. 23, 2025

(30) Foreign Application Priority Data
Oct. 29, 2021 (CN) .......................... 202111272648.0

(51) Int. Cl.
| | |
|---|---|
| *G06F 9/30* | (2018.01) |
| *G06F 21/57* | (2013.01) |
| *H04L 9/30* | (2006.01) |

(52) U.S. Cl.
CPC .............. *G06F 21/575* (2013.01); *H04L 9/30* (2013.01); *G06F 2221/034* (2013.01)

(58) Field of Classification Search
CPC ..... G06F 21/575; G06F 2221/034; H04L 9/30
See application file for complete search history.

(56) References Cited

U.S. PATENT DOCUMENTS 6,463,535 B1 * 10/2002 Drews ................... G06F 21/575
713/176
6,643,781 B1 * 11/2003 Merriam ................. G06F 21/88
713/168
(Continued)

FOREIGN PATENT DOCUMENTS

| CN | 103984976 A | 8/2014 |
|---|---|---|
| CN | 104156659 A | 11/2014 |
(Continued)

OTHER PUBLICATIONS

Search Report issued in corresponding Chinese application No. 2021112726480, Dec. 29, 2021, 3 pages.
(Continued)

*Primary Examiner* — Zahid Choudhury
(74) *Attorney, Agent, or Firm* — Merchant & Gould P.C.

(57) ABSTRACT

A system starting method includes: reading secure startup data; judging whether a private key number in the secure startup data is the same as a public key number recorded in a one time programmable memory, where the one time programmable memory records a currently effective public key number; when the private key number is the same as the public key number, performing a system startup procedure; and when the private key number is different from the public key number, sending a startup ending instruction.

18 Claims, 4 Drawing Sheets

(56) References Cited

U.S. PATENT DOCUMENTS

| | | | | |
|---|---|---|---|---|
| 8,560,823 B1* | 10/2013 | Aytek | ..................... | G06F 8/654 |
| | | | | 713/2 |
| 2008/0052610 A1* | 2/2008 | Atsumi | ................... | G06F 11/10 |
| | | | | 714/803 |
| 2008/0104402 A1* | 5/2008 | Gueron | ................ | H04L 9/3249 |
| | | | | 713/181 |
| 2011/0314271 A1* | 12/2011 | Boccon-Gibod | ....... | H04L 9/088 |
| | | | | 713/151 |
| 2015/0304313 A1 | 10/2015 | Lu et al. | | |
| 2016/0004867 A1* | 1/2016 | Gillespie | .............. | G06F 9/4401 |
| | | | | 713/2 |
| 2017/0097830 A1* | 4/2017 | Ehrenberg | ........... | G06F 21/602 |
| 2017/0099204 A1 | 4/2017 | Park et al. | | |
| 2017/0142083 A1* | 5/2017 | Kumar | ................ | G06F 12/1408 |
| 2018/0285569 A1* | 10/2018 | Spanjers | ................ | G06F 9/4401 |
| 2019/0278915 A1* | 9/2019 | Kim | ...................... | G06F 21/572 |
| 2020/0311278 A1 | 10/2020 | Lin | | |
| 2023/0100899 A1* | 3/2023 | Sayyed | .............. | G06F 11/3075 |
| | | | | 713/2 |
| 2024/0143770 A1* | 5/2024 | Yu | ......................... | G06F 21/575 |

FOREIGN PATENT DOCUMENTS

| | | | |
|---|---|---|---|
| CN | 104601600 A | 5/2015 | |
| CN | 104754552 A | 7/2015 | |
| CN | 105989894 A | 10/2016 | |
| CN | 106156618 A | 11/2016 | |
| CN | 108134676 A | 6/2018 | |
| CN | 109040041 A | 12/2018 | |
| CN | 109376557 | 2/2019 | |
| CN | 110688660 A | 1/2020 | |
| CN | 113067846 A | 7/2021 | |
| CN | 113722720 A | 11/2021 | |

OTHER PUBLICATIONS

Search Report issued in corresponding Chinese application No. 2021112726480, Dec. 3, 2021, 2 pages.

International Search Report published in related international application PCT/CN2022/083593, vol. 8, 2020Jun. 21, 2022.

Liu et al., Influence Evaluation of Integrated Energy System on the Unit Commitment in Power System, IEEE Access, pp. 163344-163356.

Chen et al., Python, Tracing and Filtering of Fake Data Based On Python Crawler Technology, China Academic Journal Electronic Publishing House, Mar. 2021; pp. 346-350.

Liu et al. Analysis of Windows Start-up Process, J. of Information Engineering University, vol. 10, No. 3, Sep. 2009, 4 pages.

* cited by examiner

SYSTEM STARTING METHOD, SYSTEM STARTING DEVICE, SERVER, AND READABLE STORAGE MEDIUM

The present application is a National Stage Filing of the PCT International Application No. PCT/CN2022/083593 filed on Mar. 29, 2022, which claims priority to Chinese Patent Application No. 202111272648.0, filed with China National Intellectual Property Administration on Oct. 29, 2021, which is incorporated herein by reference in its entirety.

TECHNICAL FIELD

The present disclosure relates to the field of the computer technologies, and more particularly, relates to a system starting method, a system starting device, a server, and a computer-readable storage medium.

BACKGROUND

With the continuous development of information technologies, a computer system and an embedded system are both applied in various scenarios. System startup programs of these systems are all required to read system data from a non-volatile storage device and then start the systems normally. The system data refers to data required to be loaded for the normal startup of the systems. Because the system data stored in non-volatile storage device is likely to be illegally tampered due to network intrusions or virus attacks, the system may have significant security vulnerabilities if the system is still started using the illegally-tampered system data.

In related technologies, an asymmetric encryption technology and a digital digest technology are adopted to perform digital signature and signature verification on the system data. However, there is usually only one private key used for performing digital signature on the system data. Once this private key is compromised, there is a significant security issue, leading to a decrease in system reliability.

Thus, how to improve the security of system startup is a key concern for those having ordinary skill in the art.

SUMMARY

Embodiments of the present disclosure provide a system starting method, a system starting device, a server, and a computer-readable storage medium, which may improve system startup security, and avoid using tampered system data.

The embodiments of the present disclosure provide a system starting method, including:

reading secure startup data;

judging whether a private key number in the secure startup data is the same as a public key number recorded in a one time programmable (OTP) memory, where the one time programmable memory records a currently effective public key number;

performing a system startup procedure when the private key number is the same as the public key number; and sending a startup ending instruction when the private key number is different from the public key number.

In some exemplary implementations, before judging whether the private key number in the secure startup data is the same as the public key number recorded in the one time programmable memory, the method further includes:

judging whether a secure startup control word in the secure startup data indicates an enabled state;

extracting the private key number from the secure startup data when the secure startup control word in the secure startup data indicates the enabled state; and sending a startup ending instruction when the secure startup control word in the secure startup data indicates a disabled state.

In some exemplary implementations, the operation of judging whether the private key number in the secure startup data is the same as the public key number recorded in the one time programmable memory includes:

acquiring a total number of "1" bits written in the one time programmable memory, and determining the total number of the "1" bits as the public key number; and judging whether a private key number in the secure startup data is the same as the public key number.

In some exemplary implementations, the method further includes:

modifying the currently effective public key number recorded in the one time programmable memory to obtain a new public key number when a private key leak message is received; and acquiring a public key and a private key corresponding to the new public key number.

In some exemplary implementations, the operation of modifying the currently effective public key number recorded in the one time programmable memory to obtain the new public key number when the private key leak message is received includes:

writing "1" to the least significant bit of all "0" bits in the one time programmable memory to obtain the new public key number when the private key leak message is received.

In some exemplary implementations, the operation of performing the system startup procedure when the private key number is the same as the public key number includes:

decrypting a digital signature in the secure startup data to obtain a first digest value;

performing digest value calculation on system data in the secure startup data to obtain a second digest value;

judging whether the first digest value is consistent with the second digest value;

starting the system according to the system data when the first digest value is consistent with the second digest value; and sending a startup ending instruction when the first digest value is not consistent with the second digest value.

In some exemplary implementations, the method further includes:

performing digest value calculation on the system data to obtain a digital digest; and encrypting the digital digest based on a private key corresponding to the private key number to obtain the digital signature.

The embodiments of the present disclosure further provide a system starting device, including:

a data acquisition module, configured to read secure startup data;

a secret key number judgment module, configured to judge whether a private key number in the secure startup data is the same as a public key number recorded in a one time programmable memory, where the one time programmable memory records a currently effective public key number;

a startup execution module, configured to perform a system startup procedure when the private key number in the secure startup data is the same as the public key number recorded in the one time programmable memory; and a startup ending module, configured to send a startup ending instruction when the private key number in the secure startup data is different from the public key number recorded in the one time programmable memory.

The embodiments of the present disclosure further provide a server, including:

a memory, configured to store a computer program; and a processor, configured to execute the computer program so as to implement the operations of the above system starting method.

The embodiments of the present disclosure further provide a computer-readable storage medium. The computer-readable storage medium stores a computer program. The computer program, when executed by a processor, causes the processor to implement the operations of the above system starting method.

The system starting method provided in the embodiments of the present disclosure includes: reading the secure startup data: judging whether the private key number in the secure startup data is the same as the public key number recorded in the one time programmable memory, where the one time programmable memory records the currently effective public key number; performing the system startup procedure when the private key number is the same as the public key number; and sending the startup ending instruction when the private key number is different from the public key number.

Whether a unified number is adopted is determined according to the private key number in the secure startup data and the public key number recorded in the one time programmable memory, so as to determine whether the private key in the system data is paired with the currently effective public key, thereby keeping consistency of secret keys, avoiding the problem of security caused by private key leak, improving system startup security, and improving system reliability:

The embodiments of the present disclosure further provide a system starting device, a server, and a computer-readable storage medium, having the above beneficial effects which are not repeated herein.

BRIEF DESCRIPTION OF THE DRAWINGS

In order to describe technical solutions in the embodiments of the present disclosure or in the related art more clearly, the drawings required to be used in descriptions of the embodiments or the related art will be simply introduced below. Obviously, the drawings described below are only some embodiments of the present disclosure, and those having ordinary skill in the art may obtain other drawings according to the provided drawings without creative effort.

DETAILED DESCRIPTION

The embodiments of the present disclosure provide a system starting method, a system starting device, a server, and a computer-readable storage medium, which may improve system startup security, and avoid using tampered system data.

To make objectives, technical solutions and advantages of embodiments of the present disclosure more clear, the technical solutions in the embodiments of the present disclosure are clearly and completely described in combination with drawings in the embodiments of the present disclosure as below. It is apparent that the described embodiments are only a part rather than all of embodiments of the present disclosure. All other embodiments obtained by those having ordinary skill in the art based on the embodiments of the present disclosure without creative efforts shall fall within the scope of protection of the present disclosure.

In related technologies, an asymmetric encryption technology and a digital digest technology are adopted to perform digital signature and signature verification on system data. However, there is usually only one private key used for performing digital signature on the system data. Once this private key is compromised, there is a significant security issue, leading to a decrease in system reliability.

Thus, the embodiments of the present disclosure provide a system starting method. Whether a unified number is adopted is determined according to a private key number in secure startup data and a public key number recorded in a one time programmable memory, so as to determine whether a private key in the system data is paired with a currently effective public key, thereby keeping consistency of secret keys, avoiding the problem of security caused by private key leak, improving system startup security, and improving system reliability.

The system starting method provided by the present disclosure is described in an embodiment below.

Figure 1:
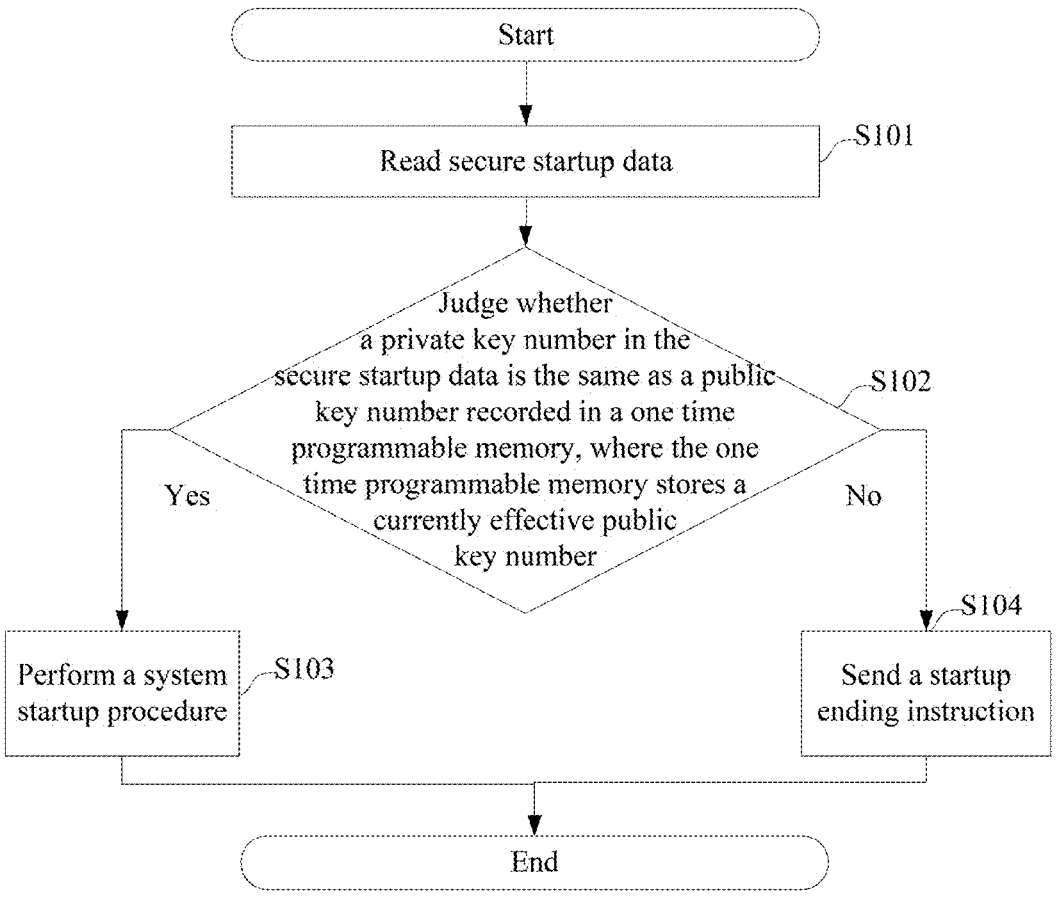
FIG. 1 is a flowchart of a system starting method according to the embodiments of the present disclosure.

Please refer to FIG. 1, and FIG. 1 is a flowchart of a system starting method according to the embodiments of the present disclosure.

In the embodiments, the method may include operations S101 to S104.

At S101, secure startup data is read.

It is apparent that in the exemplary solution, this operation mainly reads the secure startup data. The secure startup data may include system data, a secure startup control word, a digital signature of the system data, and a private key number.

Further, the method in the embodiments may further include the following operations 1 to 3.

At operation 1, whether the secure startup control word in the secure startup data indicates an enabled state is judged.

At operation 2, the private key number is extracted from the secure startup data when the secure startup control word in the secure startup data indicates the enabled state.

At operation 3, a startup ending instruction is sent when the secure startup control word in the secure startup data indicates a disabled state.

It is apparent that the exemplary solution mainly illustrates that the secure startup control word may also be used for judgment. In the exemplary solution, whether the secure startup control word in the secure startup data indicates the enabled state is judged. The private key number is extracted from the secure startup data when the secure startup control word in the secure startup data indicates the enabled state. The startup ending instruction is sent when the secure startup control word in the secure startup data indicates a disabled state. The secure startup control word is a field for controlling whether a secure startup is performed. When the field is set to indicate an enabled state, it represents that the secure startup is to be performed, and the private key number may be acquired to perform subsequent operations. When the field is set to indicate a disabled state, it represents that the secure startup operation is not to be performed, the startup operation is ended, and the startup procedure is exited directly.

At S102, whether the private key number in the secure startup data is the same as a public key number recorded in a one time programmable memory is judged, where the one time programmable memory records a currently effective public key number.

Based on the operation S101, this operation mainly judges whether the private key number in the secure startup data is the same as the public key number recorded in the one time programmable memory, where the one time programmable memory stores the currently effective public key number. In other words, this operation involves judging whether the private key number stored in the secure startup data is the same as the recorded effective public key number. During normal use, the private key number is consistent with the public key number. In other words, when recording a specific number of a public key currently used, the private key with the same number is supposed to be correspondingly used.

Further, this operation may further include the following operations 1 and 2.

At operation 1, a total number of "1" bits written in the one time programmable memory is acquired, and the total number of the "1" bits is determined as the public key number.

At operation 2, whether the private key number in the secure startup data is the same as the public key number is judged.

It is apparent that the exemplary solution mainly focuses on how to judge whether the private key numbers are the same. In the exemplary solution, the total number of "1" bits written in the one time programmable memory is acquired, and is determined as the public key number, and whether the private key number in the secure startup data is the same as the public key number may be judged.

Further, based on the above exemplary solution, the method in the embodiments may further include the following operations 1 and 2.

At operation 1, the currently effective public key number recorded in the one time programmable memory is modified to obtain a new public key number when a private key leak message is received.

At operation 2, a public key and a private key corresponding to the new public key number are acquired.

It is apparent that the exemplary solution mainly illustrates how to update the public key and the private key when the keys leak. In the exemplary solution, the currently effective public key number recorded in the one time programmable memory is modified to obtain the new public key number when the private key leak message is received, and the public key and the private key corresponding to the new public key number are acquired.

The private key leak message may be a private key leak message sent in response to vulnerabilities detected after a security system performs security monitoring, and may also be a private key leak message sent by those having ordinary skill according to experience or other information. It is apparent that the manners of acquiring the private key leak message are not restricted to the above manners provided in the embodiments, and are not limited herein.

Further, the operation 1 in the above exemplary solution may include:

when the private key leak message is received, "1" is written to the least significant bit of all "0" bits in the one time programmable memory, to obtain a new public key number.

It is apparent that the exemplary solution mainly illustrates how to acquire the public key number. The number of bits recorded in the one time programmable memory is used as the public key number. Data in the one time programmable memory may only be written once, which may ensure the reliability of the data and avoid the problem of data tampering.

At S103, a system startup procedure is performed when the private key number in the secure startup data is the same as the public key number recorded in the one time programmable memory.

Based on the operation S102, this operation aims to perform the system startup procedure when the numbers are the same. The system startup procedure may include directly performing system startup, or performing system judgment after security judgment, or performing a system startup operation after a corresponding verification operation is performed. It is apparent that the system startup procedure in this operation is not restricted to the above described procedures, and is not limited herein.

Further, this operation may further include the following operations 1 to 5.

At operation 1, the digital signature in the secure startup data is decrypted to obtain a first digest value.

At operation 2, digest value calculation is performed on the system data in the secure startup data to obtain a second digest value.

At operation 3, whether the first digest value is consistent with the second digest value is judged.

At operation 4, a system is started according to the system data when the first digest value is consistent with the second digest value.

At operation 5, a startup ending instruction is sent when the first digest value is not consistent with the second digest value.

It is apparent that the exemplary solution mainly illustrates how to perform the system startup procedure. In the exemplary solution, the digital signature in the secure startup data is decrypted to obtain the first digest value; digest value calculation is performed on the system data in the secure startup data to obtain the second digest value; whether the first digest value is consistent with the second digest value is judged; the system is started according to the system data when the first digest value is consistent with the second digest value; and the startup ending instruction is sent when the first digest value is not consistent with the second digest value.

In the exemplary solution, the digest values are further compared in the startup procedure, that is, additional verification operation is performed according to the digest values, thereby improving verification reliability. The method for calculating a verification value may be any calculation method in the related art, which is not repeated herein.

At S104, a startup ending instruction is sent when the private key number in the secure startup data is different from the public key number recorded in the one time programmable memory.

Based on the operation S102, when the public key number is different from the private key number, it represents that there is a certain security issue, requiring stop of the startup operation and sending of the startup ending instruction.

In addition, the method in the embodiments may further include the following operations 1 and 2.

At operation 1, digest value calculation is performed on the system data to obtain a digital digest.

At operation 2, the digital digest is encrypted based on a private key corresponding to the private key number to obtain a digital signature.

It is apparent that the exemplary solution mainly illustrates how to acquire the digital signature. In this exemplary solution, the digest value calculation is performed on the system data to obtain the digital digest, and the digital digest is encrypted based on a private key corresponding to the private key number to obtain the digital signature.

In conclusion, in the embodiments, whether a unified number is adopted is determined according to the private key number in the secure startup data and the public key number recorded in the one time programmable memory, so as to determine whether the private key in the system data is paired with the currently effective public key, thereby keeping consistency of secret keys, avoiding the problem of security caused by private key leak, improving system startup security, and improving system reliability.

The system starting method provided in the embodiments of the present disclosure is further described through the following exemplary embodiment.

In the exemplary embodiment, data for secure system startup is first generated and stored in a non-volatile memory. The data includes system data, a secure startup control word, a digital signature of the system data, and a private key number. Firstly, a hashing algorithm is adopted to perform hashing calculation on the system data to obtain a digital digest, then, the digital digest is encrypted using a private key in an asymmetric encryption algorithm, so as to generate the digital signature of the system data. There are totally N pairs of private keys and public keys. It is assumed herein that the $n^{th}$ private key is adopted in the process of generating the digital signature.

Figure 2:
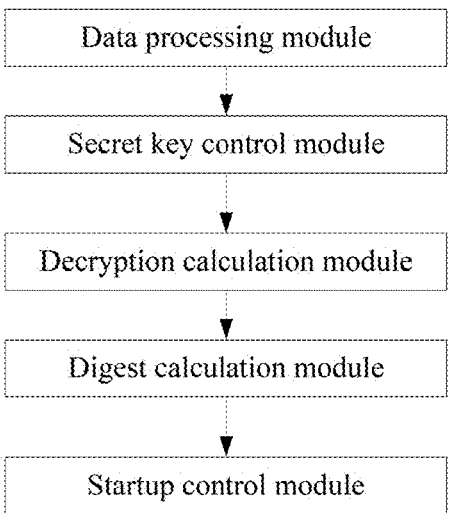
FIG. 2 is a structural schematic diagram of a secure starting device for implementing a system starting method according to the embodiments of the present disclosure.

Please refer to FIG. 2, and FIG. 2 is a structural schematic diagram of a secure starting device for implementing a system starting method according to the embodiments of the present disclosure.

The secure starting device includes a data processing module, a secret key control module, a decryption calculation module, a digest calculation module, and a startup control module.

The data processing module may read startup data from the non-volatile memory, and extract system data, a secure startup control word, a digital signature of the system data, and a private key number from the startup data. The extracted data may also be utilized by other modules.

The secret key control module includes a secure startup control word judgment submodule, a storage area of an OTP memory storing public keys, a storage area of the OTP memory storing public key numbers, and a number judgment submodule. The secure startup control word judgment submodule may judge whether secure startup is enabled. The storage area of the OTP memory storing public keys may store N public key values (with the number value starting from 0), and public keys written into the OTP memory cannot be modified. The storage area of the OTP memory storing public key numbers totally has N bits, and values of various bits may be changed one by one only from the least significant bit. Assuming that the initial value of the storage area of the OTP memory storing public key numbers is "0", after the value of the $0^{th}$ bit is written with "1", it is indicated that the $0^{th}$ public key is required for decryption. When the decryption public key is required to be changed into the $n^{th}$ decryption public key, it is needed to write "1" to the $0^{th}$, $1^{st}$, ..., and $n^{th}$ bits in sequence. In other words, from the least significant bit to the most significant bit, there are n+1 bits sequentially written with the value of "1", which indicates that the currently effective public key number value is n. It is to be noted that the decryption public key may only be updated in the direction of the increased number value. The number judgment submodule judges whether the private key number value is matched with the public key number value. When the $n^{th}$ private key has been compromised, it is necessary to write "1" to the $(n+1)^{th}$ bit to enable the $(n+1)^{th}$ public key. In the first operation of generating the digital signature, the private key corresponding to the $(n+1)^{th}$ public key is required for encryption, such that the system may be successfully started. Accordingly, the $n^{th}$ private key is invalidated, thereby avoiding security vulnerabilities caused by private key leak.

The decryption calculation module includes a hardware decryption logic for the asymmetric encryption algorithm. After inputting the digital signature of the system data into the decryption calculation module, decrypted digest data may be obtained.

The digest calculation module includes a hashing calculation logic. After inputting the system data into the decryption calculation module, digest data corresponding to the system data may be output.

The startup control module includes two submodules: a digest value comparison submodule and an action control submodule. The digest value comparison submodule may compare whether digest data obtained after decrypting the digital signature is consistent with digest data calculated according to the system data. The action control submodule controls system actions according to an output result of the digest value comparison submodule, so as to shut down or start a system by using the system data.

Figure 3:
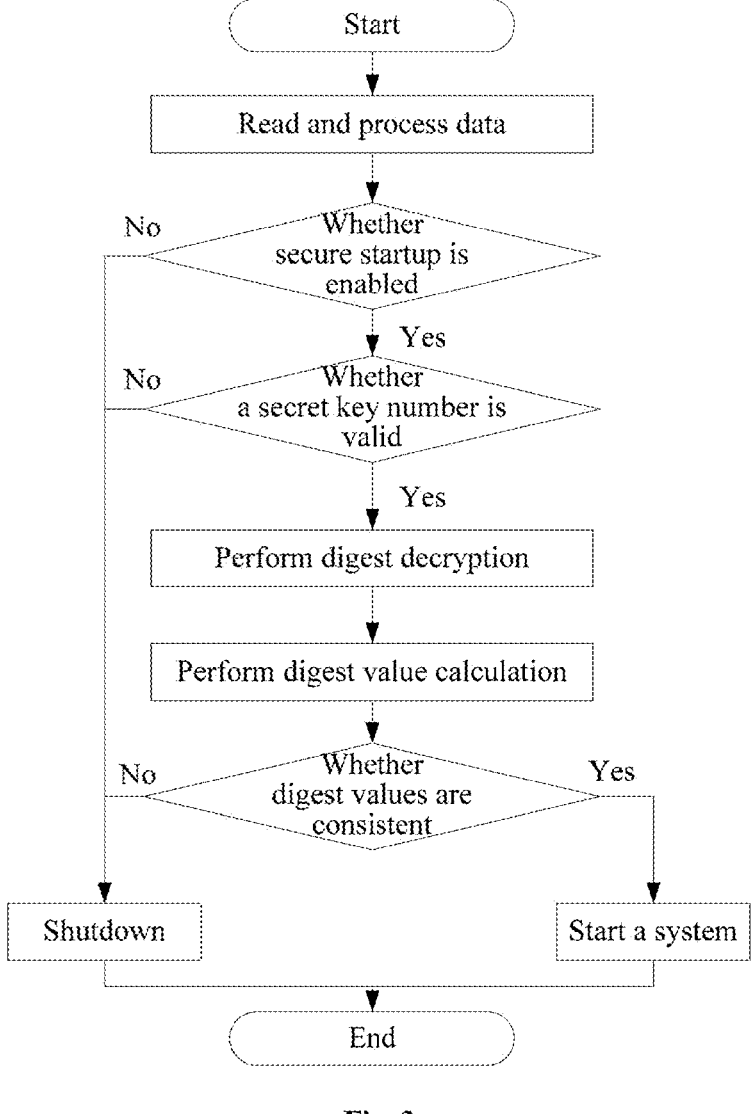
FIG. 3 is a flowchart of another system starting method according to the embodiments of the present disclosure.

Please refer to FIG. 3, and FIG. 3 is a flowchart of another system starting method according to the embodiments of the present disclosure. The system starting method includes the following operations 1 to 0.

At operation 1, a data processing module reads secure startup data from a non-volatile memory, and extracts and caches the secure startup data into system data, a secure startup control word, a digital signature of the system data, and a private key number.

At operation 2, a secret key control module reads the secure startup control word cached in the operation 1, and analyzes the value of the secure startup control word, when the control word indicates that secure startup is enabled, the flow proceeds to the operation 3, and when the control word indicates that secure startup is disabled, the flow proceeds to the operation 8.

At operation 3, the secret key control module reads a public key number value stored in the OTP memory, and compares the public key number value stored in the OTP memory with the private key number cached in the operation 1, when the public key number value stored in the OTP memory and the private key number are consistent, the flow proceeds to the operation 4, and when the public key number value stored in the OTP memory and the private key number are not consistent, the flow proceeds to the operation 8.

At operation 4, a decryption calculation module performs a decryption operation according to the digital signature cached in the operation 1 to obtain a digest value A.

At operation 5, a digest calculation module calculates a digest value B according to the system data cached in the operation 1.

At operation 6, a startup control module compares whether A and B in the operations 4 and 5 are the same, when A and B are the same, it is indicated that the system data is not tampered and is valid data, and the flow proceeds to the operation 7, and when A and B are different, it is indicated that the system data is tampered and is invalid, the flow proceeds to the operation 8.

At operation 7, the system is started according to the system data, and the process ends.

At operation 8, the procedure is ended because system startup conditions are not met.

Apparently, in the embodiments, whether a unified number is adopted is determined according to the private key number in the secure startup data and the public key number recorded in the one time programmable memory, so as to determine whether the private key in the system data is paired with the currently effective public key, thereby keeping consistency of secret keys, avoiding the problem of security caused by private key leak, improving system startup security, and improving system reliability.

A system starting device provided in the embodiments of the present disclosure is introduced below, and the system starting device described below and the system starting method described above may be cross-referenced correspondingly.

Figure 4:
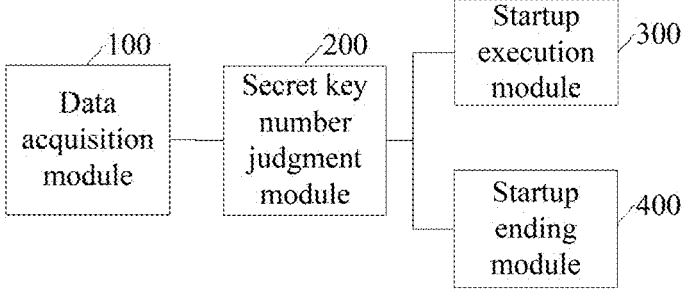
FIG. 4 is a structural schematic diagram of a system starting device according to the embodiments of the present disclosure.

Please refer to FIG. 4, and FIG. 4 is a structural schematic diagram of a system starting device according to the embodiments of the present disclosure.

In the embodiments, the device may include:

a data acquisition module 100, configured to read secure startup data;

a secret key number judgment module 200, configured to judge whether a private key number in the secure startup data is the same as a public key number recorded in a one time programmable memory, where the one time programmable memory records the currently effective public key number;

a startup execution module 300, configured to perform a system startup procedure when the private key number in the secure startup data is the same as the public key number recorded in the one time programmable memory; and a startup ending module 400, configured to send a startup ending instruction when the private key number in the secure startup data is different from the public key number recorded in the one time programmable memory.

In some exemplary implementations, the device may further include:

a controller judgment module, configured to judge whether the secure startup control word in the secure startup data indicates an enabled state; extract a private key number from the secure startup data when the secure startup control word in the secure startup data indicates the enabled state: and send the startup ending instruction when the secure startup control word in the secure startup data indicates a disabled state.

In some exemplary implementations, the secret key number judgment module 200 is configured to acquire a total number of "1" bits written in the one time programmable memory, determine the total number of bits as a public key number, and judge whether the private key number in the secure startup data is the same as the public key number.

In some exemplary implementations, the device may further include:

a secret key update module, configured to modify the currently effective public key number recorded in the one time programmable memory to obtain a new public key number when a private key leak message is received; and acquire a public key and a private key corresponding to the new public key number.

In some exemplary implementations, the startup execution module 300 is configured to decrypt a digital signature in the secure startup data to obtain a first digest value; perform digest value calculation on system data in the secure startup data to obtain a second digest value; judge whether the first digest value is consistent with the second digest value; start the system according to the system data when the first digest value is consistent with the second digest value; and send a startup ending instruction when the first digest value is not consistent with the second digest value.

In some exemplary implementations, the device may further include:

a signature encryption module, configured to perform digest value calculation on the system data to obtain a digital digest, and encrypt the digital digest based on a private key corresponding to the private key number to obtain a digital signature.

Figure 5:
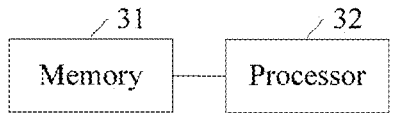
FIG. 5 is a structural schematic diagram of a server according to the embodiments of the present disclosure.

The embodiments of the present disclosure further provide a server. Please refer to FIG. 5, and FIG. 5 is a structural schematic diagram of a server according to the embodiments of the present disclosure. The server includes:

a memory 31, configured to store a computer program; and a processor 32, configured to execute the computer program so as to implement the operations of the system starting method according to the above embodiments.

Figure 6:
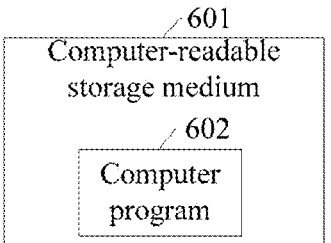
FIG. 6 is a structural schematic diagram of a computer-readable storage medium according to the embodiments of the present disclosure.

The embodiments of the present disclosure further provide a computer-readable storage medium. Please refer to FIG. 6, and FIG. 6 is a schematic structural diagram of a computer-readable storage medium according to the embodiments of the present disclosure. The computer-readable storage medium 601 stores a computer program 602. The computer program 602, when executed by the processor, causes the processor to implement the operations of the system starting method according to the above embodiments.

The various embodiments in the specification are described in a progressive manner, highlighting the differences between each embodiment and the other embodiments. The similar or identical parts between different embodiments may be cross-referenced to each other. The device provided in the embodiments corresponds to the method provided in the embodiments, and thus is described briefly, and for associated parts, please refer to part of the description of the method.

Those having ordinary skill in the art may further realize that units and algorithm operations in various examples described in the embodiments disclosed in the specification may be implemented by electronic hardware, computer software or a combination of both. To clearly describe interchangeability of the hardware and the software, the above description has generally described compositions and operations of various examples according to functions. Whether these functions are implemented in a hardware manner or a software manner depends on specific applications and design constraints of the technical solution. Those having ordinary skill in the art may use different methods to implement the described functions for each specific application. However, such implementations are not to be considered outside the scope of the present disclosure.

The method or algorithm operations described in the embodiments disclosed in the specification may be implemented directly by hardware, a software module executed by the processor, or a combination of both. The software module may be arranged in a Random Access Memory (RAM), an internal memory, a Read-Only Memory (ROM), an electrically programmable ROM, an electrically erasable programmable ROM, a register, a hard disk, a removable disk, a CD-ROM or any other form of storage medium known in the technical field.

The system starting method, the system starting device, the server, and the computer-readable storage medium provided by the present disclosure are described in detail. The specific examples are applied in this specification to illustrate the principles and implementations of the application. The descriptions of the above embodiments are only intended to facilitate understanding of the method and core ideas of the present disclosure. It is to be noted that a plurality of improvements and modifications may also be made on the present disclosure by those having ordinary skill in the art without departing from the principle of the present disclosure, and shall fall within the scope of protection of the present disclosure.

What is claimed is:

1. A system starting method, comprising:

reading secure startup data;

judging whether a private key number in the secure startup data is the same as a public key number recorded in a one time programmable memory, wherein the one time programmable memory records a currently effective public key number;

performing a system startup procedure when the private key number is the same as the public key number, wherein performing the system startup procedure when the private key number is the same as the public key number comprises: decrypting a digital signature in the secure startup data to obtain a first digest value; performing digest value calculation on system data in the secure startup data to obtain a second digest value; judging whether the first digest value is consistent with the second digest value; starting a system according to the system data when the first digest value is consistent with the second digest value; and transmitting a startup ending instruction when the first digest value is not consistent with the second digest value; and transmitting a startup ending instruction when the private key number is different from the public key number.

2. The system starting method according to claim 1, wherein before judging whether the private key number in the secure startup data is the same as the public key number recorded in the one time programmable memory, the method further comprises:

judging whether a secure startup control word in the secure startup data indicates an enabled state;

extracting the private key number from the secure startup data when the secure startup control word in the secure startup data indicates the enabled state; and transmitting a startup ending instruction when the secure startup control word in the secure startup data indicates a disabled state.

3. The system starting method according to claim 1, wherein judging whether the private key number in the secure startup data is the same as the public key number recorded in the one time programmable memory comprises:

acquiring a total number of "1" bits written in the one time programmable memory, and determining the total number of the "1" bits as the public key number; and judging whether the private key number in the secure startup data is the same as the public key number.

4. The system starting method according to claim 3, further comprising:

modifying the currently effective public key number recorded in the one time programmable memory to obtain a new public key number when a private key leak message is received; and acquiring a public key and a private key corresponding to the new public key number.

5. The system starting method according to claim 4, wherein modifying the currently effective public key number recorded in the one time programmable memory to obtain the new public key number when the private key leak message is received comprises:

writing "1" to the least significant bit of all "0" bits in the one time programmable memory to obtain the new public key number when the private key leak message is received.

6. The system starting method according to claim 1, further comprising:

performing digest value calculation on the system data to obtain a digital digest; and encrypting the digital digest based on a private key corresponding to the private key number to obtain the digital signature.

7. A server, comprising:

a memory, configured to store a computer program; and a processor, configured to execute the computer program to implement following operations:

reading secure startup data;

judging whether a private key number in the secure startup data is the same as a public key number recorded in a one time programmable memory, wherein the one time programmable memory records a currently effective public key number;

performing a system startup procedure when the private key number is the same as the public key number, wherein performing the system startup procedure when the private key number is the same as the public key number comprises: decrypting a digital signature in the secure startup data to obtain a first digest value; performing digest value calculation on system data in the secure startup data to obtain a second digest value; judging whether the first digest value is consistent with the second digest value; starting a system according to the system data when the first digest value is consistent with the second digest value; and transmitting a startup ending instruction when the first digest value is not consistent with the second digest value; and transmitting a startup ending instruction when the private key number is different from the public key number.

8. A non-transitory computer-readable storage medium, storing a computer program, wherein the computer program, when executed by a processor, causes the processor to implement following operations:

reading secure startup data;

judging whether a private key number in the secure startup data is the same as a public key number recorded in a one time programmable memory, wherein the one time programmable memory records a currently effective public key number;

performing a system startup procedure when the private key number is the same as the public key number, wherein performing the system startup procedure when the private key number is the same as the public key number comprises: decrypting a digital signature in the secure startup data to obtain a first digest value; performing digest value calculation on system data in the secure startup data to obtain a second digest value; judging whether the first digest value is consistent with the second digest value; starting a system according to the system data when the first digest value is consistent with the second digest value; and transmitting a startup ending instruction when the first digest value is not consistent with the second digest value; and transmitting a startup ending instruction when the private key number is different from the public key number.

9. The system starting method according to claim 1, wherein the secure startup data comprises system data, a secure startup control word, a digital signature of the system data, and the private key number.

10. The system starting method according to claim 4, wherein the private key leak message is a private key leak message sent in response to vulnerabilities detected after a security system performs security monitoring, or is a private key leak message sent by maintenance personnel.

11. The system starting method according to claim 1, wherein the system startup procedure comprises: directly performing system startup, or performing system judgment after security judgment, or performing a system startup operation after a corresponding verification operation is performed.

12. The system starting method according to claim 1, wherein a first storage area of the one time programmable memory stores N public key values, and a second storage area of the one time programmable memory stores public key numbers totally having N bits, wherein values of the N bits are changed one by one from a least significant bit of the N bits.

13. The server according to claim 7, wherein the processor is configured to execute the computer program to implement following operations before judging whether the private key number in the secure startup data is the same as the public key number recorded in the one time programmable memory:

judging whether a secure startup control word in the secure startup data indicates an enabled state;

extracting the private key number from the secure startup data when the secure startup control word in the secure startup data indicates the enabled state; and transmitting a startup ending instruction when the secure startup control word in the secure startup data indicates a disabled state.

14. The server according to claim 7, wherein judging whether the private key number in the secure startup data is the same as the public key number recorded in the one time programmable memory comprises:

acquiring a total number of "1" bits written in the one time programmable memory, and determining the total number of the "1" bits as the public key number; and judging whether the private key number in the secure startup data is the same as the public key number.

15. The server according to claim 14, wherein the processor is configured to execute the computer program to further implement following operations:

modifying the currently effective public key number recorded in the one time programmable memory to obtain a new public key number when a private key leak message is received; and acquiring a public key and a private key corresponding to the new public key number.

16. The server according to claim 15, wherein modifying the currently effective public key number recorded in the one time programmable memory to obtain the new public key number when the private key leak message is received comprises:

writing "1" to the least significant bit of all "0" bits in the one time programmable memory to obtain the new public key number when the private key leak message is received.

17. The server according to claim 7, wherein the processor is configured to execute the computer program to further implement following operations:

performing digest value calculation on the system data to obtain a digital digest; and encrypting the digital digest based on a private key corresponding to the private key number to obtain the digital signature.

18. The server according to claim 7, wherein the secure startup data comprises system data, a secure startup control word, a digital signature of the system data, and the private key number.

* * * * *